Figure 1:
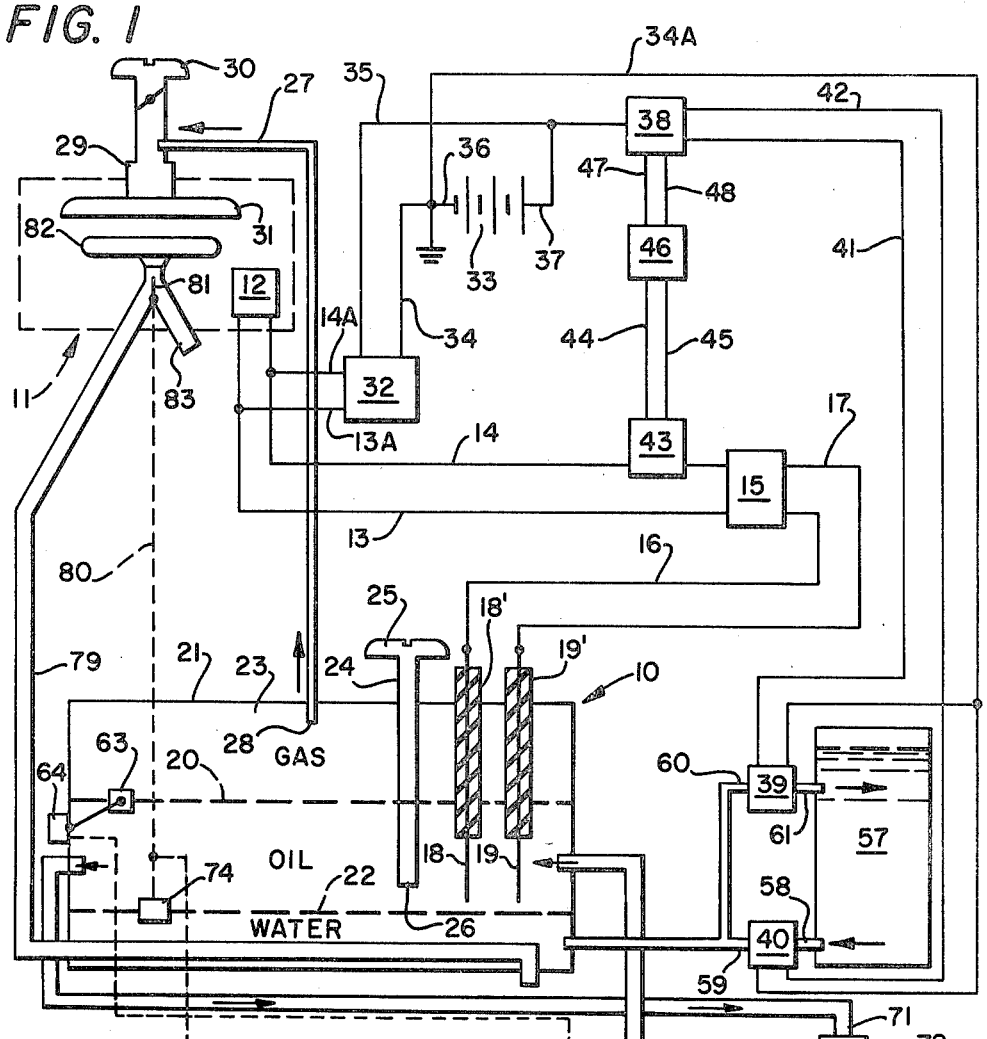

United States Patent [19]

Carr et al.

[11] Patent Number: 4,458,634
[45] Date of Patent: Jul. 10, 1984

[54] INTERNAL COMBUSTION ENGINE WITH HYDROGEN PRODUCING DEVICE HAVING WATER AND OIL INTERFACE LEVEL CONTROL

[76] Inventors: Edwin R. Carr, 5211 Astaria; Donald L. Carr, 5406 Hillside, both of Amarillo, Tex. 79109

[21] Appl. No.: 465,769

[22] Filed: Feb. 11, 1983

[51] Int. Cl.³ .................. F02B 43/08; C25B 15/02; C25B 9/00; C25B 15/08
[52] U.S. Cl. .................. 123/3; 123/DIG. 12; 123/536; 204/229; 204/270; 204/274; 204/278; 204/306; 204/308
[58] Field of Search .......... 204/229, 306, 308, 129, 204/275-278, 274, 270; 123/DIG. 12, 3, 536

[56] References Cited

U.S. PATENT DOCUMENTS

| | | | |
|---|---|---|---|
| 1,754,009 | 4/1930 | Cage | 204/306 |
| 2,136,469 | 11/1938 | Sauer | 204/306 |
| 2,336,205 | 12/1943 | Willauer | 204/306 X |
| 3,704,222 | 11/1972 | Kusovsky et al. | 204/306 |
| 3,849,285 | 11/1974 | Prestridge | 204/306 X |
| 4,033,851 | 7/1977 | Oros | 204/306 X |
| 4,271,793 | 6/1981 | Valdespino | 123/DIG. 12 |
| 4,361,474 | 11/1982 | Shoaf et al. | 123/DIG. 12 |

FOREIGN PATENT DOCUMENTS 2344648 10/1977 France ................. 204/229

Primary Examiner—Donald R. Valentine
Attorney, Agent, or Firm—Warren H. Kintzinger

[57] ABSTRACT

A control system for maintaining a desired water level range from electrodes spaced thereabove in a layer of oil where alternating current discharge occurs from electrode down to and through water to another electrode, with the electrical discharge occurring between electrodes disposed at all times in the hydrocarbon oil layer. With the situs of reaction being confined to the oil and the interstitial boundry between the oil and water, dangerous conditions of hydrogen generation are generally obviated over most state-of-the-art methods of producing hydrogen with a highly efficient production process. Hydrocarbon gases and vapors are also produced from the oil with a cracking process occuring to some extent incumbant with the A C discharge from the electrodes through the oil to the water. This has also been found to gradually upgrade the quality of the oil remaining while some is at the same time consumed in the system. The hydrocarbon gases and vapors are also subject to hydrogen enrichment during the ongoing process. In a system with hydrogen produced being used along with hydrocarbon gases and vapors produced from the oil to run an internal combustion engine A C power developed by an A C generator driven by the engine flows through a current transformer to a step transformer increasing the A C voltage applied to the electrodes used in the process. A C current being sensed develops a D C signal, through a rectifier, proportional to the A C power current being fed to the electrodes. The D C signal is passed through control circuity to activate individual relay controls when the signal level falls below a desired level and rises above a desired level. This is effective to, at preset signal levels, activate a pump or open a drain cock for removing water from the tank or another pump (or reversal of a pump) to feed water back to the tank to maintain the water level in the tank within a desired range consistent with desired rates of hydrogen generation through the process.

29 Claims, 2 Drawing Figures

INTERNAL COMBUSTION ENGINE WITH HYDROGEN PRODUCING DEVICE HAVING WATER AND OIL INTERFACE LEVEL CONTROL

This invention relates in general to the electrodecomposition of water and cracking of oil to produce gaseous hydrogen along with hydrocarbon gases and, more particularly, to production of hydrogen and hydrogen enriched hydrocarbon gases in a container holding oil and water and a closed space for gas above oil and water layers with AC discharge from electrodes in the oil layer down to and through the water from one electrode to another with a water level control activated for water removal or water addition by predetermined levels of AC power current flow.

The process for producing hydrogen and other gases, such as set forth in U.S. Pat. No. 4,233,132 and entitled "Method and Apparatus for Producing Hydrogen", of which we are two of the co-inventors, produces hydrogen in varying amounts consistent with AC power supplied and the application. With AC electric power essential to the process, power control is required which, if the power is 60 cycle AC supplied by a power company, may be provided by standard controls. However, in adapting the process to fuel a conventional internal combustion engine there are various control and electric power supply considerations. In remote locations standard AC electric power may not be available, and in fueling an engine with hydrogen gas produced by the process precise process control is important. Standard controls have not been found that would yield the control accuracy required in the operating electromagnetic arc discharge state encountered in the process. The electromagnetic discharge arc voltage runs in the range of 1,000 to 2,000 volts with arc discharge initiating potential peaking as high as 8,000, even 10,000 volts-voltage variations and levels detrimental to many electronic controls. It is important that the water level control system be able to provide the close control required even though the AC power signal varies in frequency and that the control have high level and low level set points to operate relays and/or pumps or valves. A controlling factor in varying the AC current is the water level to electrode spacing that is varied through addition of water or removal of water. As crude oil is used in the process, water in the oil not used by the process may be removed to maintain the water level within the control limits required. Where heretofore electrodes were adjustable to compensate wear or water lever changes the improved water level control automatically compensates for electrode wear and eliminates the need for adjustable electrodes.

It is, therefore, a principal object of this invention to provide wear and oil interface level spacing control from electrodes regardless of the state of electrode erosion in an electrodecomposition of water hydrogen production and hydrocarbon gas production oil cracking process.

Another object is to ahcieve the desired water level control through sensed levels of AC power current flow.

A further object is to provide such a water level control with an upper level control set point and a lower level control set point.

Still another object is to provide such amperage current flow span between control upper level and lower level set points as to allow for small variations in AC power line current.

Another object is to provide such a water level control not subject to pump water level control actuation by current surges of short duration through a built-in time delay in the control circuit.

Features of the invention useful in accomplishing the above objects include, in a water and oil interface level to electrode end space control of a system for electrodecomposition of water to produce hydrogen along with hydrocarbon gas, produced with oil cracking, fueling an engine, an AC power current level sensed control for activating an upper water level control for removal of water and for activation of a lower water level control for adding of water. AC power developed by an AC generator driven by the engine flows through a current transformer to a step transformer increasing the AC voltage applied to the electrodes used in the process. The AC current being sensed develops a DC signal, through a rectifier, proportional to the AC power current being fed to the electrodes. This DC signal is applied through control circuitry to activate respective relay controls when the signal level rises above a desired level, and when the signal level falls below a desired level. This acts, at preset signal levels, to activate a pump or open a drain cock for removing water from the tank or another pump (or reversal of a pump) to feed water back to the tank to maintain the water level in the tank within a desired range consistent with desired rates of hydrogen generation through the process.

A specific embodiment of the water and oil interface level to electrode spacing control in a hydrogen and hydrocarbon gas production process presently regarded as the best mode of carrying out the invention is illustrated in the accompanying drawing.

IN THE DRAWING

Figure 2:
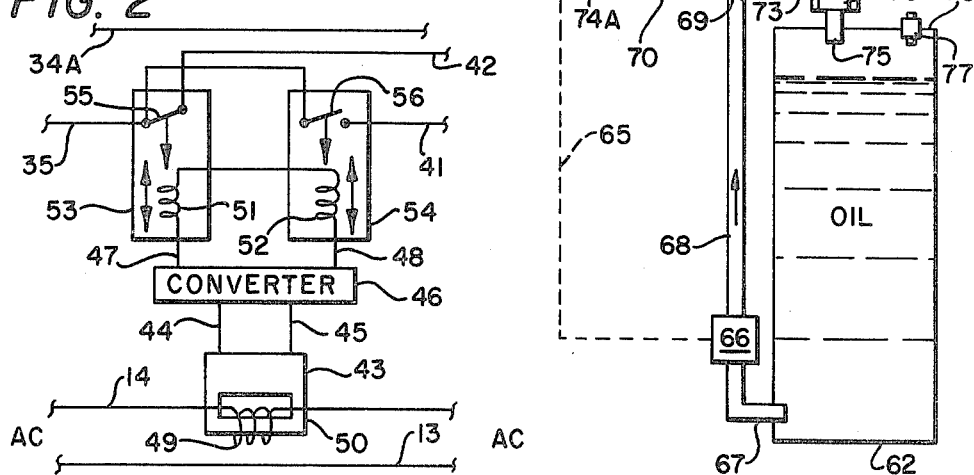

FIG. 1 represents a block schematic diagram of a hydrogen and hydrocarbon gas production unit fueling an engine and the water level to electrode spacing control system therefor; and, FIG. 2, a partial block schematic showing AC power current sensing to high set point relay and low set point relay for controlled activation of high level and low level water pumps.

REFERRING TO THE DRAWING

The hydrogen and hydrocarbon gas production unit 10 is shown in FIG. 1 to be connected for feeding gaseous fuel and hydrocarbon vapors to an engine 11 useful to any number of purposes such as a stationary power plant for powering any number of things (detail not shown). A generator 12, driven by engine 11 in a conventional manner, develops AC power fed through lines 13 and 14 to step up transformer 15 that has high voltage output connections through lines 16 and 17 to electrodes 18 and 19, respectively, the exposed portions of which, generally below the insulated feed mounts 18' and 19', are in a layer of oil 20. The hydrogen gas production unit 10 has a tank 21 containing a lower layer of water 22, the layer of oil 20 above the water and a closed space 23 for gas above the layer of oil 20. The gap spacing between the bottom ends of electrodes 18 and 19 and the upper surface of the water layer 22 is important in the electrodecomposition of water to produce gaseous hydrogen where with AC power current flow decreasing with increased spacing between the electrodes 18 and 19 and the water layer 22. Obviously, the level of AC power flow in discharge through the oil 20 to the water layer 22 controls the degree of oil cracking and hydrocarbon gas production.

The hydrogen and hydrocarbon gas production unit 10 is provided with an air inlet pipe 24 extending from an air cleaner 25 above the tank 21 to an outlet end 26 well within the layer of oil 20 to dispel inlet air into the oil layer 20. Air and gas fuel (mostly hydrogen along with hydrocarbon gas) is fed through pipe 27 from open end 28 within closed space 23 to valve and carburetor structure 29 on engine 11 through which additional air may be drawn from air filter 30 and delivered to inlet manifold 31 for engine 11. The AC power output of generator 12 is also connected through lines 13A and 14A to AC to DC rectifier 32 that rectifies the AC to provide 12-volt DC for charging 12-volt battery 33 through lines 34 and 35 to battery terminals 36 and 37, respectively, with line 34 being the ground connection line for the system. The positive DC power line 35 is connected to control head 38 where subject to set level relay control power circuits are completed for power activation of high level pump 39 and low level pump 40 through DC power lines 41 and 42, respectively, when a level limit is sensed.

The current transformer 43 senses the AC power flow being delivered through line 14 to step up transformer 15 and develops a proportional low power AC signal fed through lines 44 and 45 to rectifier 46 (AC to DC inverter) supplying a like proportioned DC signal, low in the milliamp range, to control head 38 through DC lines 47 and 48.

Referring also to the partial block schematic showing of FIG. 2, power line 14 is shown to include a coil 49 wound around a ferrite circuit loop 50 of the current transformer 43. The DC leads 47 and 48 out of AC to DC converter 46 are shown to be series connected through current sensitive, adjustable, series connected coils 51 and 52 of relays 53 and 54 that have, respectively, a normally closed relay switch 55 and a normally open switch 56. The normally closed switch 55 of relay 53 is activated by the current flow at a preset current flow sensing level to open, and below that level to close, for the application of power through line 42 to low level pump 40 to pump water from water supply tank 57 through water pipe 58 to the pump 40 and from the pump 40 through line 59 to the water layer 22. This raises the upper surface of the water layer and decreases the gap between the low ends of electrodes 18 and 19 to thereby provide progressive increase in current flow to and through the electrodes 18 and 19, hydrocarbon material of oil layer 20 and the intervening water layer 22. A further increase in current flow through the series connected coils 51 and 52 results in closing of switch 56 to apply positive DC power through line 41 to pump 39 in order to withdraw water from water level 22 in tank 21 through pipe 59 and pipe 60 to the pump 39 and on through pipe 61 back to water resevoir tank 57.

These two lower level and upper level adjustable set points in activation of the switches of relays 53 and 54 allow the system to be operated at a predetermined current level range spanning several amps that may be adjusted for specific applications with typically, in one instance, a 10-amp span being provided between the two respective relay actuation points to allow for small variations in line current. An inherent or built-in time delay in the control circuitry allows for current surges of short duration without activation of either pump. As the AC power current level rises above the set point power is supplied to the high pump 39 for removal of water from the hydrogen and hydrocarbon gas generation process tank 21. When the AC power current falls below the low set point the normally closed switch 55 of relay 53 closes to power pump 40 in order to add water to the water layer 22 in tank 21. Obviously this operates at a very effective water level to electrode gap control to thereby maintain proper power flow through the system in developing gas for fueling the engine 11 in system operation. This control of water level eliminates any need for adjusting of electrodes since it is a self-adjusting water level control to maintain water to electrode spacing within the desired range provided in the span associated with the sensed level operation of the two relays 53 and 54 in series or parallel.

It should be noted that pumps 39 and 40, either one or both, could in some installations be valves that permit exhaust flow to a lower water level outlet and that the other pump could be a valve that opens to admit water under pressure from a water pressure source to the water level 22 in tank 21.

It should also be noted that the pump drives of pumps 39 and 40 could be AC power drives instead of the DC power drive system shown by circuitry and motor equipment known to those skilled in the art. Furthermore, the frequency of AC developed by generator 12 can vary through a considerable range without having an adverse effect on the hydrogen and hydrocarbon gas process and control therefor provided herein.

Oil from oil supply tank 62 is used to supply oil to the layer of oil 20 as oil is consumed in the gas generating process as demand is indicated by float 53 and float control 64 that is connected in a conventional manner (indicated by dashed line 65) to oil supply pump 66. A pipe line 67 connection from the bottom of oil supply tank 62 to pump 66 and pipe line 68 to valve 69 and pipe line 70 feed make up oil to the layer of oil 20 at the electrode end of tank 21 when pump 66 is activated to pump oil. An oil withdrawal pipe line 71 extends from the opposite end of tank 21 from the electrode end to an oil circulation pump 72 from which outlet pipe line 73 connects to valve 69 for circulation of oil on through pipe line 70 back to the electrode end of tank 21. Temperature sensor 74 that may be located in either the oil or water near water oil surface in tank 21 and connected for activating the circulation pump 72 in a conventional manner manner as through a connection indicated by a dashed line 74A when the temperature sensed reaches a predetermined level. The circulation pump is also equipped with a pipe flow line 75 connection to the oil supply tank 62 to, as controlled by temperature control valve 76, divert some of the oil pumped by pump 72 to supply tank 62. It is of interest to note, particularly where crude oil is used in the process, the cracking action with the arc discharge of the process upgrades the oil to a more valuable higher price oil so, even though some oil is consumed in the overall system with hydrocarbon gases and vapors being used to help run a motor along with hydrogen generated the improvement in the otherwise crude oil so processed can go toward covering the cost of oil consumption. An air vent valve 77 in the top 78 of oil storage or supply tank 62 prevents pressure differential damage to the tank 62 as oil is drawn from the tank or pumped into the tank. The temperature control valve 76 is generally set to divert oil back to the supply tank 62 only when the temperature of oil being recirculation pumped by pump 72 is above a predetermined level in order that oil circulated through the oil layer 20 in tank 21 be readily maintained at a desired process temperature level without having to heat massive supplies of oil in a storage and supply tank 62. The valve 69 is a self adjusting valve permitting flow of oil from oil feed pump 66 or from circulation pump 72 or balance of oil flow from both pumps when they are simultaneously pumping.

Since the process produces more fuel in gas and vapor form at higher temperature a heat exchanger engine exhaust pipe line 79 is passed through the water layer 22 portion of process tank 21. The temperature sensor 74 is connected through a conventional connection as indicated by dash line 80 for varying valve 81 in balanced controlled diversion of hot exhaust gases from the engine exhaust manifold 82 between direct exhaust pipe 83 and the pipe line 79 extended through tank 21. This helps, for example, in countering disassociation cooling of the water as hydrogen is released from oxygen in the electro-disassociation process.

Testing of the system was conducted using a 534 cubic Ford engine running at 1,750 r.p.m. pulling a 70 horse power load with the process adding approximately an additional 15 horse power to the engine load. Oil consumption was, with proper controls, lowered into approximately the 2.5 to 4 gallon per hour consumption rate at approximately 50 hours into a run. Further, starting with 39 gravity oil with recycling of oil passed through the process tank 21 returned to large tank storage gravity of the stored oil was lowered beneficially to 36 gravity in approximately 90 hours of running.

Whereas the invention is herein described with respect to a preferred embodiment thereof, it should be realized that various changes may be made without departing from the essential contribution made by the teachings hereof.

We claim:

1. In a water layer and oil layer interface level to electrode end spacing control system useful in oil cracking hydrocarbon gas generation combined with electrodecomposition of water hydrogen production: container means for containing, a layer of water at the bottom, a layer of oil above the layer of water, and a space for containing gas above the layer of oil; electrode means positioned in said container entrained primarily in the layer of oil with an electrode means end to water layer gap; AC power source means; AC circuit means interconnecting said AC power source means and said electrode means for feeding AC power through said electrode means, the gap and water within the container; AC power current sensing means sensing current level flow through said AC circuit means; electric power control means responsive to a predetermined AC current level flow; water flow control means in the form of fluid flow impetuous means and conduit means with a line from a water source with power activation means for controlling the level of water within said container; and AC power source means connected to and through said electric power control means to said water flow control means for controlling the water level and thereby the electrode means end to water layer gap in response to predetermined AC current level flow with AC current flow varying inversely with variation in electrode means end to water layer gap spacing.

2. The water layer and electrode end spacing control system of claim 1, wherein said electrode means is a plurality of electrodes including at least one pair of electrodes with said AC power source means connected for AC power discharge current flow back and forth from one electrode through the electrode to water level gap, through water to and through the gap of the other electrode of said pair of electrodes.

3. The water layer and electrode end spacing control system of claim 2, wherein said AC power current sensing means is a current transformer output connected to said electric power control means.

4. The water layer and electrode end spacing control system of claim 3, wherein said electric power control means is switch means responsive to AC power current level for switch actuation control of the power activation means of said water flow control means.

5. The water layer and electrode end spacing control system of claim 4, wherein said water flow control means includes pump means.

6. The water layer and electrode end spacing control system of claim 5, wherein said pump means is a pump and water flow structure controlled for pumping water into said container when the water level is low and the AC power current flow sensed is below a first preset level, and for pumping water from said container when the water level is high and the AC power current flow sensed is above a preset level.

7. The water layer and electrode end spacing control system of claim 6, wherein said pump and water flow structure is connected to a reservoir tank.

8. The water layer and electrode end spacing control system of claim 6, wherein said pump and water flow structure includes a first pump for pumping water out of said container; and a second pump for pumping water into said container.

9. The water layer and electrode end spacing control system of claim 6, wherein there is a current span between control upper level and lower level set points allowing for relatively small variations in AC power line current.

10. The water layer and electrode end spacing control system of claim 6, wherein there is control level actuation time delay to prevent pump water level control actuation by current surges of short duration or current drops of short duration.

11. The water layer and electrode end spacing control system of claim 4, wherein there is an AC to DC converter in the current transformer output connection to said electric power control means.

12. The water layer and electrode end spacing control system of claim 11, wherein adjustable level relay means is used as said switch means.

13. The water layer and electrode end spacing control system of claim 12, wherein the adjustable level relay means is an upper level set point adjustable level relay and a lower level set adjustable level relay.

14. The water layer and electrode end spacing control system of claim 13, wherein there is a current span between control upper level and lower level set points allowing for relatively small variations in AC power line current.

15. The water layer and electrode end spacing control system of claim 13, wherein there is control level actuation time delay to prevent pump water level control actuation by current surges of short duration or current drops of short duration.

16. The water layer and electrode end spacing control system of claim 4, wherein said power source is an AC generator connected via control circuitry to and through said electric power control means to said water flow control means.

17. The water layer and electrode end spacing control system of claim 16, wherein said AC power source means is said AC generator, and with said AC generator driven by an engine connected for using hydrogen and hydrocarbon gases drawn from said container means as engine fuel.

18. The water layer and electrode end spacing control system of claim 17, wherein said switch means is relay means.

19. The water layer and electrode end spacing control system of claim 18, wherein said control circuitry from said AC generator includes an AC to DC converter.

20. The water layer and electrode end spacing control system of claim 19, wherein said control circuitry also includes a system battery connected in the control circuitry for charge input from said AC to DC converter.

21. The water layer and electrode end spacing control system of claim 1, wherein said circuit means interconnecting said AC power source means and said electrode means includes a step up transformer.

22. The water layer and electrode end spacing control system of claim 21, wherein said AC power current sensing means is positioned for sensing AC power current flow between said AC power source means and said step up transformer.

23. The water layer and electrode spacing control system of claim 1, wherein oil supply storage means is connected through oil supply piping means to said container means; oil layer surface level sensing and control means; and oil flow control means with power activation means connected for control by said oil layer surface level sensing and control means for controlling the level of oil within said container.

24. The water layer and electrode end spacing control system of claim 23, also including an oil circulation system with an oil piping system connected for withdrawing oil from said container and returning oil to said container, returning oil to said oil supply storage means, and moving oil from said oil supply storage means; and oil movement driving means in said oil piping system including said oil flow control means.

25. The water layer and electrode end spacing control system of claim 24, wherein said oil flow control means includes pump means connected for actuation by said oil layer surface level sensing and control means; said oil movement driving means includes a pump in said oil circulation system; temperature sensing control means in said container connected to said pump to control on and off oil moving driving actuation of said pump; and control means diverting portions of oil pumped by said pump to said oil supply storage means.

26. The water layer and electrode end spacing control system of claim 25, wherein said AC power source means is an AC generator connected via control circuitry to and through electric power control means to water flow control means; an internal combustion engine is connected for using hydrogen and hydrocarbon gases drawn from said container means as engine fuel; and said internal combustion engine being provided with an exhaust system with heat exchange means positioned in said container means.

27. The water layer and electrode end spacing control system of claim 26, wherein said exhaust system includes controllable exhaust flow diverting means; temperature sensing control means in said container connected to said controllable exhaust flow diverting means for control flow of hot exhaust gases through said heat exchange means in heating water and oil in said container means.

28. The water layer and electrode end spacing control system of claim 1, wherein said AC power source means is an AC generator connected via control circuitry to and through electric power control means to water flow control means; an internal combustion engine is connected for using hydrogen and hydrocarbon gases drawn from said container means as engine fuel; and said internal combustion engine being provided with an exhaust system with heat exchange means positioned in said container means.

29. The water layer and electrode end spacing control system of claim 28, wherein said exhaust system includes controllable exhaust flow diverting means; temperature sensing control means in said container connected to said controllable exhaust flow diverting means for control flow of hot exhaust gases through said heat exchange means in heating water and oil in said container means.

* * * * *